Patented July 24, 1951

2,561,818

UNITED STATES PATENT OFFICE 2,561,818

ELECTROLYTIC METHOD OF PROTECTING THE WALL OF A GLASS FURNACE

Ivan Peyches, Paris, France, assignor to Societe Anonyme des Manufactures des Glaces et Produits Chimiques de Saint-Gobain, Chauny & Cirey, Paris, France Application August 5, 1947, Serial No. 766,366 In France January 29, 1945

Section 1, Public Law 690, August 8, 1946 Patent expires January 29, 1965

5 Claims. (Cl. 204—147)

1

This invention relates primarily to the manufacture of glass and similar or related products, but in extension its novel conceptions are applicable to far wider fields. The invention will be primarily described in relation to the glass making art, but its general principles will be set forth and claimed in such a way as to make its more general applicability plain. A particular employment of the invention in the field of glass is adopted for illustration because of the importance of the glass making industry and because of the importance of the new invention in glass making. The particular description is not to be construed as a limitation.

Glass making furnaces are generally composed of refractory walls. The refractory walls are found to be subject to attack and erosion by the glass bath which is kept at high temperatures which become particularly high in the fining zone. As a consequence the material constituting the refractory walls of the furnace is eroded and constitutes an impurity in the glass to the extent that it is incorporated. Various controls and conceptions have been employed to combat the attack of the glass bath upon the walls of the furnace but without complete success. The high temperature of the bath, the chemical constitution of the bath, and the chemical constitution of the refractory wall of the furnace are such that the attack upon the wall by the bath is inevitable.

An object of the invention is to prevent the corrosion of the walls, which must be replaced when the corrosion has proceeded far enough and which makes the furnace idle during the period of repair, and to prevent the adulteration of the bath by the foreign materials stripped from the walls.

Another object of the invention is to employ a process of protecting the walls against the action of the bath that will be applicable to all types of glass furnaces regardless of the method of heating employed, whether by flame or by electricity, or by other means.

A further object is to protect the walls of furnaces against corrosive action of the contents of the furnace.

A yet further object of the invention is to protect the walls of tanks against the attack of the contents of the tank.

A still further object is to construct a glass furnace having a novel wall composition of refractory character.

The objects of the invention are accomplished, generally speaking, by employing constituents

2 of the bath electrolytically to protect the walls of the tank against the action of the bath. In the glass making industry this conception is carried out by electrolytically dissociating certain components of the glass bath and forming on the surface of the tank wall to be protected a protective layer, this surface constituting the anode in the electrolytic process.

In the preferred embodiment of the invention the electrolysis applies to the wall that is to be protected a pellicular layer, the substance deposited by the electrolysis current and constituting that layer being a component of the glass bath, it is generally soluble in said bath. The deposit occurs by self-adjustment or is regulated to a rate such that the rate of deposit equals the rate of solution whereby a layer of uniform thickness is continuously maintained on the surface of the wall. If it is desired to increase the electrical conductivity of the wall that is to be protected, a proportion of a rare earth metal oxide can be included in its composition, or a composition containing a rare earth metal oxide may be applied to its surface, or a rare earth metal oxide alone may be applied as a revetment to the inner surface of the tank or to the surface that is to be protected. Another method of increasing the conductivity of the wall is to include carbon in the material of the wall. Although the carbon might be supposed to taint the glass of the bath, that effect would be nullified by this invention as soon as the protective pellicle had been applied to the surface of the tank. In the drawings are diagrammatically disclosed embodiments of the invention:

Figure 1:
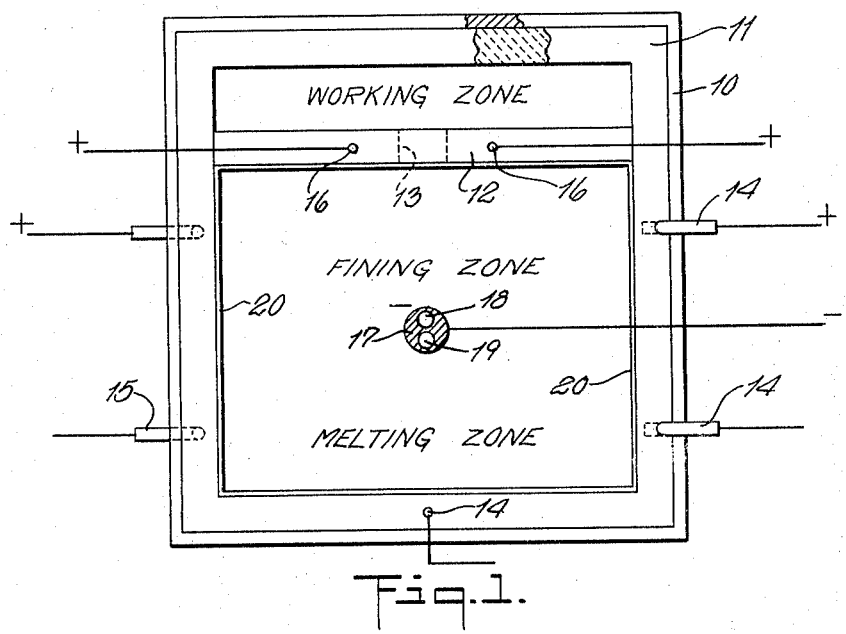
Fig. 1 is a plan view of a glass furnace tank which is presumed to employ gas flame for melting and fining the glass.

In Fig. 1 the numeral 10 indicates the refractory wall of the tank which may be of standard construction, but which is preferably of one of the types having higher electrical conductivity. The furnace has a large basin that contains the melting and fining zones which are generally indicated by labels on the drawing. The glass materials are put into the melting zone where they melt and then are gradually moved to the fining zone where a higher temperature exists and the fining occurs. A working zone, so indicated by a label, is separated from the fining zone by a baffle 12 which extends across the furnace and at the bottom of which is a passageway 13 indicated by dotted lines through which the fined glass passes to the working zone. Seated in the refractory lining of the furnace 10 are electrodes 14 entering from the top and electrodes 15 entering through the side wall of the furnace, and penetrating into the hottest part of the refractory wall close to the bath. Similar electrodes 16 are sunk in the refractory baffle 12. All these electrodes are supplied with direct current from a suitable source such as a generator. In the center of the furnace is an iron electrode 17 having a water supply pipe 18, 19 through which water passes to cool the electrode and prevent disintegration of the iron. The electrode 17 is electrically connected to the negative pole of the direct current generator.

As the processing of the glass proceeds current passes from the electrodes through the walls of the furnace which are thereby constituted as an electrolytic anode to the cathode 17 which is an electrolytic cathode. Certain elements of the bath, which is conductive by reason of its temperature are thereby dissociated and the anions migrate to the wall 10, 12 and produce upon its surface a pellicule 20, the proportion of which has not been kept in the drawing, but which is of sufficient thickness to protect the surface of the tank against the action of the bath.

These products of dissociation that gather on the anode have practically no effect upon the refractory materials habitually employed in the glass industry or in similar industries so that the refractory is protected not only against the bath of glass but against all attack capable of corroding it. It is possible that this results from the fact that the substances which are deposited upon the anode are deprived of alkaline materials and are constituted by silica or other oxides which are relatively inert, but whatever the reason the fact is established. Whatever are the materials that the bath gathers from this protective pellicule, they do not adulterate the bath because the pellicle contains nothing except constituents which are advantageously a part of the glass.

In the case of glasses that are principally constituted of a mixture of alkaline silicates the decomposition of the bath by electrolytic current is effectuated by the reaction following, which is typical:

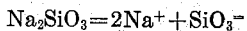

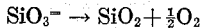

Thus a layer of silica is deposited on the refractory wall.

When the liquid bath has a complete chemical constitution the deposit obtained upon the wall may be constituted by a mixture of bodies. Thus in the case of glass having a low coefficient of expansion containing boric acid there has been observed on the anode a formation of silica and a formation of boric oxide, the latter being obtained by the dissociation reaction:

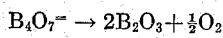

Whatever may be its nature the protective layer is less conductive of current than the material constituting the wall, generally speaking, so that in proportion as the deposit is formed the intensity of the current diminishes until the quantity of substance deposited per unit of time equals the amount of the substance dissolved in the bath, establishing an equilibrium. The intensity of the current decreases progressively from the start until the equilibrium is established and then remains constant unless there is a dislodgment of the protective layer from a portion of the protective wall, in which case the electrolytic current augments itself sharply and insures the coating of the gap with a protective layer. The operation is thus automatic.

In order to play its role of anode the wall to be protected must be sufficiently conductive to carry the current at the temperature of the bath, but as is generally known, the refractory materials ordinarily employed are to a certain extent conductors of current at those temperatures, at least in the case of the fusion of materials such as glass. Nevertheless, it is sometimes advantageous to facilitate the application of the invention by making the wall of the tank or of the receptacle with a special material chosen for good conductibility or by adding a substratum or revetment of such material to the wall. The oxides of rare earth metals are particularly useful in this use and zircon oxide taken individually or in association with other oxides is particularly useful. The mixture of zirconia 60% and magnesia 40% gives satisfactory results. In certain applications it is advantageous to include a portion of carbon such as graphite or silicon carbide in the material of the wall or revetment because of their good conduction. Under these circumstances the refractory material may in certain cases be of a quality inferior to that which is habitually used in the construction of glass furnaces. This materially lowers the cost of the refractory walls of the furnace, in such cases.

Figure 2:
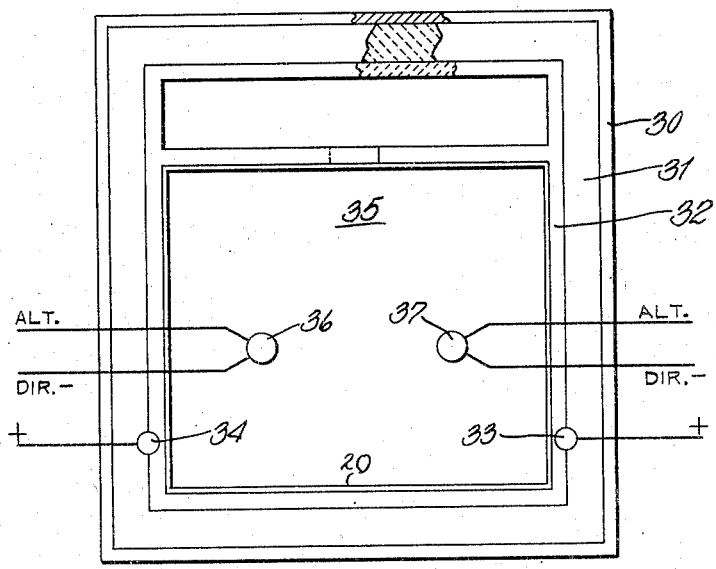
Fig. 2 is a plan view of an embodiment of the invention in which electricity is used for melting the glass by Joule effect.

The cathode employed may be located anywhere in the furnace in contact with the glass. There may be a single cathode as shown in the drawings or a plurality of cathodes, which may be located as shown or in closer proximity to the walls of the furnace, attention being paid to the intensity of direct current to be employed and the distance the current must travel in the bath. The cathode may be a water cooled tube of iron, but this may be eliminated in electric furnaces by employing one of the electrodes used to introduce the heating current as the cathode for the direct current. For instance, a graphite electrode immersed in the bath may be advantageously used for the passage of both alternating and direct current. In Fig. 2 is diagrammatically illustrated a furnace having a refractory wall 31 of ordinary refractory construction, and a refractory revetment 32 being, or containing, a rare earth metal oxide, for instance a mixture of zirconia and magnesia in the proportion 60% to 40%. Direct current electrodes 33, 34 are set in the refractory material in contact with the conductive revetment 32. Within this structure there is a bath 35 in which are plunged electrodes 36, 37 which carry alternating current for the purpose of heating the glass in the bath. These electrodes are connected to a source of alternating current as indicated by the letters ALT and to the direct current generator as indicated by the wire bearing the label DIR so that they serve not only for the heating current but also for the passage of the electrolytic current which establishes upon the wall of the vat the protective coating.

As another example, the refractory wall of the tank may be constituted by refractory blocks containing zirconia and alumina and a more conductive refractory revetment of zirconia and magnesia.

In the foregoing description the process has been described in its application to the glass industry, but it is equally applicable to other industries among which may be cited by way of example the silicate industry. It is also to be observed that the protection which is afforded to the walls of the vessel is equally applicable to baffles and to objects which are immersed in a bath for particular reasons and which are subjected to general corrosion corresponding to their conditions of working.

As many apparently widely different embodiments of the present invention may be made without departing from the spirit and scope thereof, it is to be understood that the invention is not limited to the specific embodiments, except as defined in the appended claims.

What is claimed is:

1. The method of protecting the refractory wall of a glass furnace against the action of a glass bath that consists in constructing the furnace wall of electrically conductive refractory material, melting glass in the furnace, and passing a direct current from the furnace wall as anode through the glass melt to a cathode immersed in the melt.

2. The method of protecting a wall composed of an electrically conductive refractory material comprising a metal oxide against the action of an electrically conductive molten bath from a group consisting of glass and silicates capable of attacking the wall that includes passing a direct current from the wall as anode through the molten bath to a cathode immersed in the melt.

3. The method of protecting the refractory wall of a glass furnace that includes the steps of melting glass raw materials including a material that is electrolytically dissociable when molten, passing through the molten glass in the furnace a direct current, from the wall to be protected as an anode, and thus depositing upon said wall a pellicle of oxide from the group consisting of metal oxides and silicon oxides formed by the electrolytic dissociation of said component of the glass.

4. The method of protecting a glass-furnace wall composed of electrically conductive refractory material that comprises melting glass containing silica, in the furnace and passing a direct current of electrolytic intensity through a cathode immersed in the melt, the melt, and the wall as an anode.

5. A method of protecting an electrically conductive body of erodible constitution from the action of a bath of molten glass that includes the step of establishing an electric circuit through the glass employing the glass as a conductor in the circuit, constituting the body an electrode in the circuit for the passage of said current, and passing direct current of electrolytic intensity through the said circuit in a direction that makes the body an anode.

IVAN PEYCHES.

REFERENCES CITED

The following references are of record in the file of this patent:

UNITED STATES PATENTS

| Number | Name | Date |
|---|---|---|
| 335,059 | Cowles et al. | Jan. 26, 1886 |
| 1,099,131 | Serpek | June 2, 1914 |
| 1,470,195 | De Roiboul | Oct. 9, 1923 |
| 1,543,905 | Clawson | June 30, 1925 |
| 1,594,496 | Clark | Aug. 3, 1926 |
| 1,785,888 | Cox et al. | Dec. 23, 1930 |
| 1,815,978 | Hitner | July 28, 1931 |
| 2,098,812 | Pulfrich | Nov. 9, 1937 |

FOREIGN PATENTS

| Number | Country | Date |
|---|---|---|
| 10,507 | Great Britain | of 1887 |
| 683,867 | Germany | Nov. 17, 1939 |

OTHER REFERENCES

"Metallurgical & Chemical Engineering," vol. 13, (1915), page 265.